Aug. 30, 1960 | J. L. D. MORRISON | 2,950,920

AUTOMATIC PHONOGRAPHS

Filed Oct. 7, 1953 | 6 Sheets-Sheet 1

Inventor
JAMES L. D. MORRISON
By Fred Gerlach
his Atty

Inventor
JAMES L. D. MORRISON
By: Fred Gerlach
his Atty.

Aug. 30, 1960 J. L. D. MORRISON 2,950,920

AUTOMATIC PHONOGRAPHS

Filed Oct. 7, 1953 6 Sheets-Sheet 3

Inventor:
JAMES L. D. MORRISON
By [signature] His Atty

Inventor
James L. D. Morrison
By Fred Gerlach his Atty

Aug. 30, 1960

J. L. D. MORRISON 2,950,920

AUTOMATIC PHONOGRAPHS

Filed Oct. 7, 1953

6 Sheets-Sheet 5

INVENTOR.

JAMES L. D MORRISON

By: Fred Gerlach his Atty

Aug. 30, 1960 J. L. D. MORRISON 2,950,920

AUTOMATIC PHONOGRAPHS

Filed Oct. 7, 1953 6 Sheets-Sheet 6

INVENTOR.

JAMES L.D. MORRISON

By: Fred Gerlach his Atty

United States Patent Office 2,950,920

Patented Aug. 30, 1960

2,950,920

AUTOMATIC PHONOGRAPHS

James L. D. Morrison, 261 Searles Ave., Benton Harbor, Mich.

Filed Oct. 7, 1953, Ser. No. 384,731

4 Claims. (Cl. 274—10)

The invention relates to phonographs, and more particularly to that type which is adapted for reproducing records succesively on both faces of the record-disks.

One object of the invention is to provide a phonograph with a turntable which is movable from its operative position in a compartment or cabinet to the outside thereof for convenience in loading the disks on the lower turntable.

Another object of the invention is to provide, in a phonograph consisting of a cabinet, an opening in the cabinet and a record changer mounted therein, a record loading means movably mounted within the cabinet and movable through the opening for receiving records.

Another object of the invention is to provide improved means for transferring the record-disks from the lower turntable onto the upper spindle.

Another object of the invention is to provide a phonograph with improved mechanism which is adapted to reproduce records on both faces of the disks.

Another object of the invention is to provide an improved record-changing device which is operable by power for dropping record-disks from the upper spindle onto the lower turntable and around the lower spindle.

Another object of the invention is to provide, in a phonograph having a record storing and playing spindle, together with a record loading and playing spindle movably mounted for movement into and out of the cabinet, a common driving means adapted to drive both spindles for playing records.

Other objects of the invention will appear from the detailed description.

The invention consists in the several novel features hereinafter set forth and more particularly defined by claims at the conclusion hereof.

Figure 1:
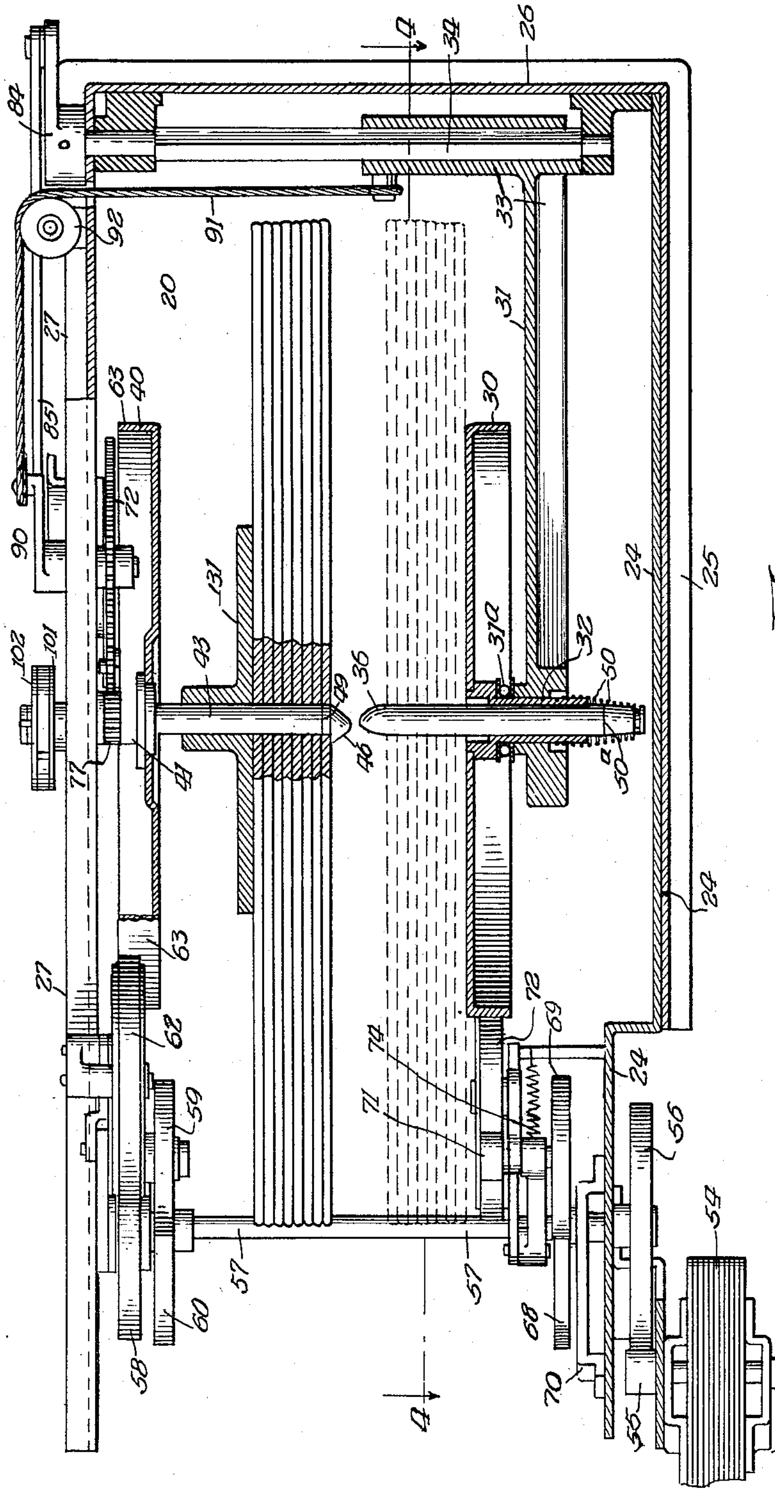
Fig. 1 is a vertical section taken on line 1—1 of Fig. 2, parts being omitted.

The invention comprises generally: a lower turntable with an upstanding spindle, for reproducing records on the upper face of each record disk; an upper turntable with a depending spindle for supporting a group of disks for playing the records on the under face thereof; motor-driven mechanism for driving the turntable respectively in opposite directions for the reproduction of the records on the upper face of the disks on the lower turntable and the records on the under face of the disks on the upper spindle; selectively controlled and power operable means for shifting the lower turntable from its operative position under the upper spindle and in the cabinet to the outside of a compartment for conveniently loading a group of record-disks on the lower turntable and returning the loaded lower turntable to its operative position; selectively controlled power-operated means for transferring a stack of record-disks from the lower turntable onto the upper spindle for reproducing records on their under faces; a selectively controlled power-operable offset or detent for supporting records on the upper spindle and which is operable to guide the record-disks from the lower spindle onto the upper spindle; and a power-operated device on the upper spindle for dropping the lowermost record-disk from the upper spindle onto the lower turntable.

The invention is exemplified with a cabinet 20 which has walls forming a compartment 21 in which the phonograph is enclosed. Cabinet 20 may be provided with compartments for other instruments or storing records. The front wall 22 of the cabinet is provided with an opening 23 through which the lower turntable may be swung to the front of the cabinet for conveniently loading disks on said turntable and unloading them therefrom and through which the loaded turntable is retracted and into said compartment in its operative position.

The operating mechanism of the phonograph is supported by a base plate 24 which may be fixedly mounted in the cabinet. A frame or channel beam which includes a lower member 25 fixed to the base plate 24, an upstanding member 26, and a horizontally extending upper member 27, constitutes a support for the upper and lower turntables, the devices for swinging the lower turntable, the lifting mechanism for the lower turntable, and the record-changing device.

A lower turntable 30 is supported by an arm 31 for horizontal swinging movement into and out of the compartment 21. A depending sleeve or hub 32, fixed to turntable 30, is journalled in a bearing 31*a* on the distal end of arm 31 for rotation of said turntable by the driving mechanism hereinafter described. The arm 31 has a hub 33 which is mounted to slide vertically on a shaft 34 which is pivotally supported in brackets on the frame 26. Shaft 34 is polygonal and fits a corresponding bore in sleeve 33 for swinging arm 31 to shift the turntable 30 between its operative position in the cabinet and a loading position outside thereof. An arm 84 fixed on the upper end of shaft 34 is operable by power as hereinafter described to rock said shaft for the lateral swinging movements of arm 31 and turntable 30. A spindle 36 for holding record-disks concentrically on lower turntable 30 is supported to swing laterally with said turntable.

An upper turntable 40 has a hub 41 which is journalled in a bearing 42, which is fixedly supported on the stationary frame member 27. Said turntable is also journalled on an anti-friction bearing 44 between spindle 43 and bearing 42. A tubular spindle 43 is secured to rotate concentrically with the turntable 40, and has its upper end fixed to a hub 41a and its lower end fixed to a hub 41b which are fixed in said spindle.

Figures 5, 6, 7:
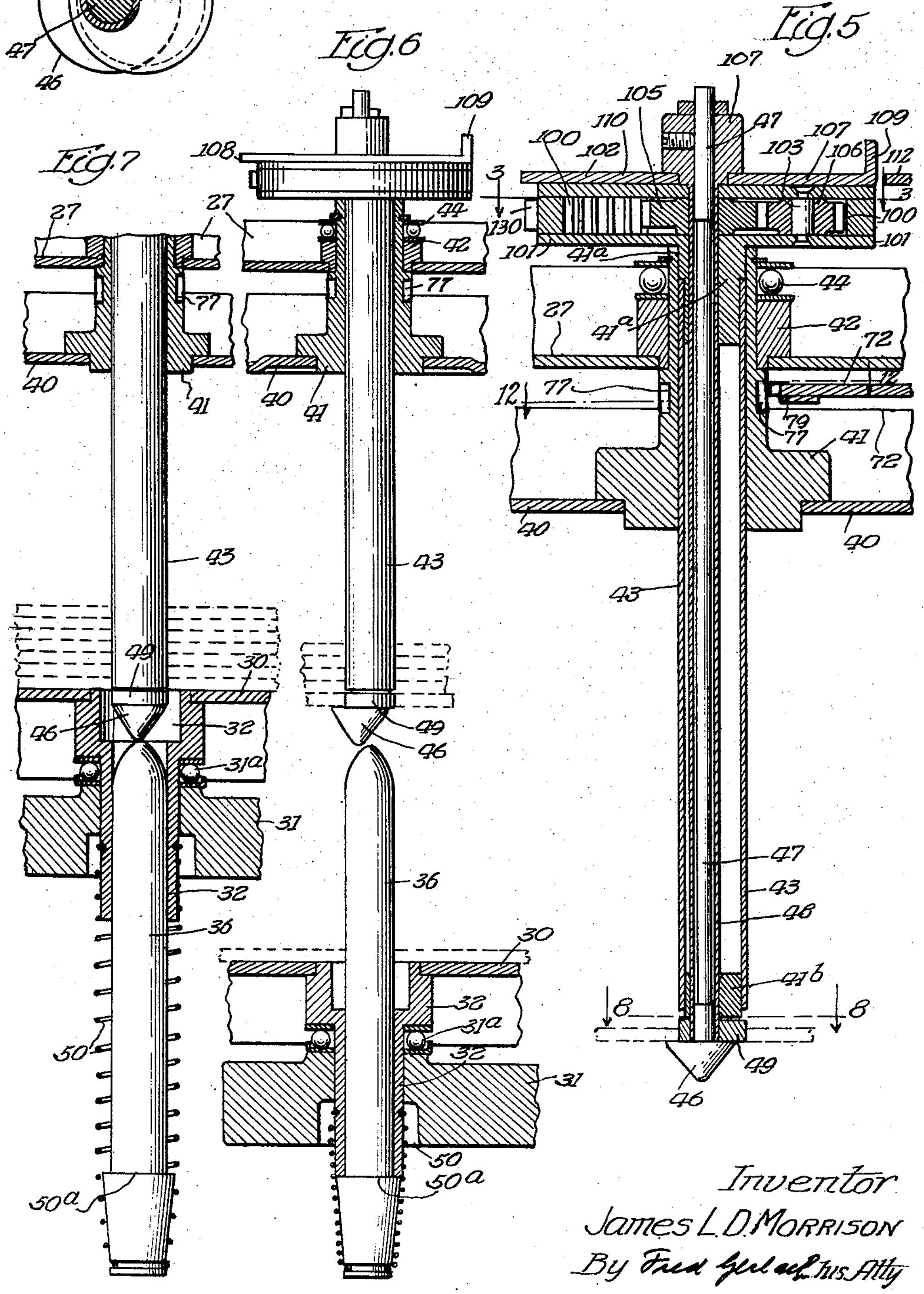
Fig. 5 is a vertical section on an enlarged scale taken through the upper spindle and its associated parts.
Fig. 6 is a side elevation of the upper and lower spindles in their operative position for dropping the record-disks from the upper spindle to the lower spindle, parts being shown in section.
Fig. 7 is a similar view, illustrating the lower turntable with record-disks thereon, raised for transfer onto the upper spindle.

The record-disks are slidable from spindle 36 onto spindle 43 for first reproducing a record on the underface of the disk and are then dropped from the upper spindle 43 onto the lower turntable for successively reproducing the records on the upper face of the disks. A detent 46 having a circular upper face of a diameter corresponding substantially to the outer diameter of tubular spindle 43, is fixed below the lower end of said spindle to a shaft 47 which is concentrically journalled in a tubular shaft 48, which is eccentrically journally in bearings 41a and 41b in the spindle 43. The detent 46 is normally rotatable eccentrically relatively to spindle 43 and projects from one side of and below said spindle for supporting record-disks as shown in Fig. 5 and rotatable into concentricity with said spindle, for guiding record-disks from the lower spindle 36 onto the upper spindle 43 as shown in Fig. 7. The side of detent 46 is upwardly flared to direct said disks from the spindle 36 to and around the upper spindle 43. A lever 107 is fixed to the upper end of shaft 47 for rotating the detent 46 relatively to the spindle 43.

The hub 33 of arm 31 which supports the lower turntable, is vertically slidable on shaft 34, for raising and lowering said arm and turntable, to transfer record-disks from the lower spindle 36 to the upper spindle 43. Hub 33 and arm 31 are raised and lowered by power as hereinafter described. A spring 50 yieldingly urges lower spindle 36 upwardly to engage a shoulder 50a thereon with the lower end of hub 33 and has its ends connected to said sleeve and the lower end of said spindle, for permitting spindle 36 to be arrested by the lower end of upper spindle 43 during the upward movement of turntable 30 while a group of disks is being transferred from the lower spindle 36 onto the upper spindle 43 and retracts said spindle to its upstanding position when said turntable is lowered into normal position.

Figure 8:
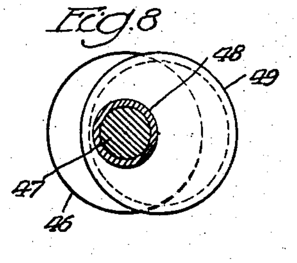
Fig. 8 is a section taken on line 8—8 of Fig. 5.

An ejector 49 for shifting the lowermost record on spindle 43 to drop off detent 46 fits in the center hole of the record-disks and is fixed to the lower end of a tubular shaft 48 which is journalled in bearings 41a and 41b in said spindle. The ejector 49 is disposed between the lower end of spindle 43 and detent 46, and is cylindrical in contour at its upper face, and has a diameter corresponding substantially to the diameter of the detent 46 and spindle 43. Normally, the ejector is concentrically positioned below spindle 43 and eccentrically positioned above detent 46 for holding the lowermost record-disk of the stack on detent 46 concentric with the superposed disks, and eccentric to the detent 46 as shown in Figs. 5 and 8. When shaft 48 is rotated a cycle of one revolution in the spindle 43, ejector 49 will be shifted into concentricity with the detent 46 so the lowermost record will drop at the end of the first half of said revolution. During the second half of said revolution, ejector 49 will rotate back into concentricity with spindle 43 and eccentricity to detent 46, and permit the next disk to drop onto said detent. Ejector 49, when the detent 46 is shifted to guide record-disks onto the upper spindle 43, will be concentric with said detent so that the disks can pass onto said spindle over the ejector.

The upper and lower turntables are driven in opposite directions from an electric motor 54, which is suitably supported under the base plate 24. A friction-pulley 55 on the motor shaft engages and drives a friction-pulley 56 on the lower end of an upright shaft 57 from which both turntables are driven.

The mechanism for driving the upper turntable 40 and spindle 36 in counter-clockwise direction from shaft 57 comprises: a friction pulley 58 on shaft 57, a pulley 59 engaged by pulley 58 and suitably journalled on the upper frame member 27, a pulley 60 rotating with pulley 59, a pulley 61 engaging with pulley 59 and journalled on the frame member 27, and a pulley 62 engaging pulley 61 and the rim 63 of the upper turntable 40. Pulley 62 is carried by a linkage 64 which is pressed by a spring 65, to engage pulleys 62 and 63. This gearing will drive turntable 40 and the upper spindle 43 in counter-clockwise direction as indicated by the arrow in Fig. 2 for reproducing records on the under face of the lowermost record supported on the upper spindle 40.

The mechanism for driving the lower turntable 30 from shaft 57 comprises: a friction pulley 68 on shaft 57, a pulley 69 engaged by pulley 68 and journalled in a bearing plate 27a on the base plate 24, a pulley 71 rotatable with pulley 69, and a pulley 70 engaging the rim of the lower turntable 30 and pulley 71. Pulley 70 is supported by a linkage 73 and a spring 74 is applied to hold pulley 70 in yielding engagement with pulley 71 and turntable 30. This mechanism is adapted to rotate the lower turntable 30 and the records supported thereon in the clockwise direction as indicated by the arrow in Fig. 3. The drive pulley 70 is arranged relatively to the turntable 30 to permit the latter to swing to the outside of the cabinet and maintain driving relation with said turntable when it is returned to its operaive position in the cabinet.

The devices for performing the series of operations involved in the change of groups of record-disks, that is: swinging the lower turntable 30 with the disks thereon after the records on both sides of said disks have been reproduced, for unloading and reloading the said turntable outside of the cabinet; rotating the detent 47 from its eccentric position on spindle 43 to its concentric posiion thereon for guiding disks from the lower spindle 36 onto the spindle 43 and from its said concentric position back to its said eccentric position for supporting records; and raising the lower turntable 30 to transfer the record-disks thereon onto the upper spindle and lowering said turntable into its operative position, are operable by power from motor 54. The friction gearing which drives the upper turntable 40 from shaft 57, drives a pinion 77 on the hub 41 of turntable 40. A gear 72 on a shaft which is journalled in frame member 27, has interrupted teeth, and a selectively controlled detent 79 is adapted to co-act with said interruption in the teeth of gear 72 to start and stop gear 72 in cycles of one revoluion for each series of operations. The detent 79 may be selectively and manually controlled by a suitable connection with a push-button (not shown). Each complete revolution of gear 72 will automatically produce said series of operations in properly timed relation.

Mechanism which controls and swings arm 31 to shift the lower turntable 30 between its normal position in the cabinet and to its loading position outside of the cabinet during a portion of each revolution of gear 72, comprises: a cam plate 80 pivoted on a fulcrum 81 supported on frame member 27 and provided with cam members 80a and 80b; an upstanding stud 82 on gear 72 which is engageable with said cam plate; a crank arm 84 on the upper end of vertical shaft 34 on which the hub 33 of arm 31 is slidable; a link 85 which has one of its ends connected by a pin and slot 86 to the cam plate 80, and its other end pivoted to arm 84, for rotating shaft 34 to swing the turntable to the outside of the cabinet when stud 82 engages cam member 80a; and a spring 87 applied between cam plate 80 and frame member 27 for swinging said cam plate and crank arm 84 for retracting turntable 30 into the cabinet under control of cam-member 80b, stud 82, and slot 86. During the initial portion of each complete cycle of gear 72, stud 82 engages cam-member 80a and swings plate 80 to take up the lost motion of link 85 in slot 86 and operate link 85 into the position shown in Fig. 10. Link 85 will rock crank-arm 84 to swing shaft 34, the arm 31 for moving turntable 30 to the outside of the cabinet, as shown by dotted lines in Fig. 3. Spring 87 will next retract cam plate 80 and link 55 and swing the arm 31 for moving the turntable 30 into its operative position in the cabinet, while cam-member **80*b* engages and rides off stud 82. During this retraction, the swinging of cam plate 80 is controlled by the cam member 80*b*, which is held against stud 82 by spring 87. Spring 87 urges plate 80 to retain link 85 and arm 34** in their normal position.

The device for raising and lowering arm 31, lower turntable 30 and spindle 36, for transferring a group of records from spindle 36 onto spindle 43, comprises: an arm 90 which is fixed to rotate with gear 72 and a cable 91 which has one of its ends pivotally connected to arm 90, is guided by a sheave 92 on frame member 27 and has its other end connected to the hub 33 of arm 31. During each complete revolution of gear 72, arm 90 will operate cable 91 to raise and lower arm 31 and turntable 30 for transferring the group of disks from said turntable to the upper spindle 43 and then lower said turntable into its operative position for receiving record disks from the upper spindle after the records on the under faces of the disks have been reproduced. Cable 91 has sufficient slack to permit the rotation of shaft 34 and hub 33 during the horizontal swinging movement of arm 31.

The mechanism for controlling and operating lever 107 which is fixed to the shaft 47 of detent 46, during a cycle of the rotation of gear 72, for rotating detent 46 from eccentricity to spindle 43 and ejector 49 to concentricity therewith during the transfer of record disks from the lower turntable 30 with the upper spindle 43, comprises: a lever 112 which is pivotally supported on frame member 27 and is adapted to engage an abutment 108 on lever 107, for arresting shaft 47 and detent 46 against rotation for a one-half revolution with spindle 43; a stud 113 on a disk 114 which is fixed to the shaft of and rotates with gear 72; and a cam 115 on lever 112 engageable by stud 113 for swinging lever 112 into the eccentric path of abutment 108 on lever 107. During rotation of shaft 47, detent 46 and lever 108 with spindle 43, the eccentric disposition of shaft 47 relatively to the axis of spindle 43 will cause the lever 107 to move alternately toward and away from lever 112 in one-half revolution cycles. When lever 112 is shifted by stud 113, the abutment 108 on lever 107 during its movement toward lever 112 will engage lever 112 so that lever 107, shaft 47 and detent 46 will be arrested during a one-half revolution of spindle 43. At the end of said one-half revolution, the shaft 47 and lever 107 move away from lever 112, and abutment 108 will be released from lever 112. The spindle 43, detent 46 and ejector 49 will then be in concentric relation to slidably guide the record-disks to be shifted from the lower spindle 36 on to the upper spindle 43. When lever 112 is disengaged from abutment 108, a spring 116 will retract lever 112 to the outside of the eccentric path of abutment 108 and into its normal position against a stop 123. The mechanism for controlling detent 46 also comprises: a lever 117 which is pivotally supported on the frame member 27, and is adapted to engage an upstanding abutment 109 on lever 107 for arresting shaft 47 in one-half revolution cycles; a cam 121 on lever 117, and a stud 120 on disk 114 which rotates with gear 72 and is adapted to engage cam 121 for shifting lever 117 into the path of abutment 109 on lever 107. When lever 117 is shifted by stud 120, the abutment 109 on lever 107, during its movement toward lever 117, will engage said lever 117 and lever 107, shaft 47 and detent 46 will be arrested during a one-half revolution of spindle 43. At the end of said half revolution, shaft 47 and lever 107 will move away from lever 117, and abutment 109 will be released so that the detent 47 will be in eccentric relation to the spindle 43 for supporting record-disks on said spindle. When lever 117 is disengaged from abutment 109, a spring 125 will retract lever 117 outside of the eccentric path of said abutment and its normal position against a stop 124. Abutments 108 and 109 are vertically offset so that abutment 108 will engage only lever 112 and abutment 109 will engage only lever 117.

Before the arm 31 and turntable 30 are raised for transferring disks from the lower turntable 30 onto spindle 43, the detent 46 will be rotated into concentricity with the upper spindle 43 into position to direct the record-disks from spindle 36 and the lower turntable 30. During the upward movement of turntable 30 with record-disks thereon, the lower spindle 36 will strike and be arrested by the detent 46 while it is concentric with spindle 43. The continued upward movement of said turntable will slide said disks past said detent onto the spindle 43 and above the ejector 49 as shown by dotted lines in Fig. 7. The operation of detent 46 is timed to rotate to concentricity with spindle 43 and ejector 49 before the turntable 30 is raised, and to rotate back to its eccentric position relatively to spindle 43 and ejector 49 while the disks on turntable 30 are raised above said detent. A weight or follower 131 is slidable on spindle 43 and adapted to hold the disks horizontal while supported on detent 46.

The mechanism for operating and controlling ejector 49 is effective in one-half revolution cycles relatively to said spindle, for dropping the lowermost disk held by detent 46 on spindle 43, and comprises: a pinion 105 fixed to the shaft 48 of ejector 49; a carrier including plates 101 and 102 which are secured together in spaced relation by studs 103 and are rotatable with spindle 43; an internal gear 100 between plates 101 and 102; idler pinions 106 journalled on studs 103 and meshing with pinion 105 and gear 100; a lever 127 which is pivotally supported on the frame-member 27; a tooth or abutment 130 on internal gear 100 which is engageable by lever 127 to arrest said gear against rotation with spindle 43; and a connection 131 which is usually controlled by the swinging movements of the tone-arm 132. When lever 127 is shifted by connection 131 into the eccentric path of tooth 130, said tooth will move toward and be arrested by lever 127 against rotation with the spindle 43 during a one-half revolution cycle of said spindle at the end of which the tooth 130 will move away from and release gear 100 for rotation with the spindle 43. During this cycle of arrest of gear 100 it will, on account of the 2 to 1 ratio of gear 100 and sun-pinion 105, rotate shaft 48 and ejector 49 a complete revolution relatively to the spindle 43. The ejector 49 will rotate relatively to spindle 43 and detent 46 to move the lowermost record-disk from concentricity with spindle 43 into concentricity with detent 49 to drop the lowermost disk, and back into eccentricity with detent 49 and concentricity with the spindle 43 to permit the next disk to drop onto and be held by the detent 49. A tone or pick-up arm 140 is suitably mounted on the base-plate 24 for lateral pivotal movement over the record-disks, and for vertical pivotal movement, and is provided with a reproducer 141 with a needle 142 for engaging the underface of a disk on the upper spindle 43 and a needle 143 for engaging a record on the upper face of a record-disk on lower turntable 30. The tone-arm may be connected to means for shifting lever 127 for controlling the ejector 49 to drop a disk from spindle 43 after the record on the underface of said disk has been reproduced. The tone-arm may also be connected to control means for engaging needle 143 with a record on the upper face of a disk dropped onto the lower turntable. During the dropping of a disk from upper spindle 43 onto lower spindle 36, the tone-arm will be shifted outwardly of the path of the disks.

Figures 2, 3:
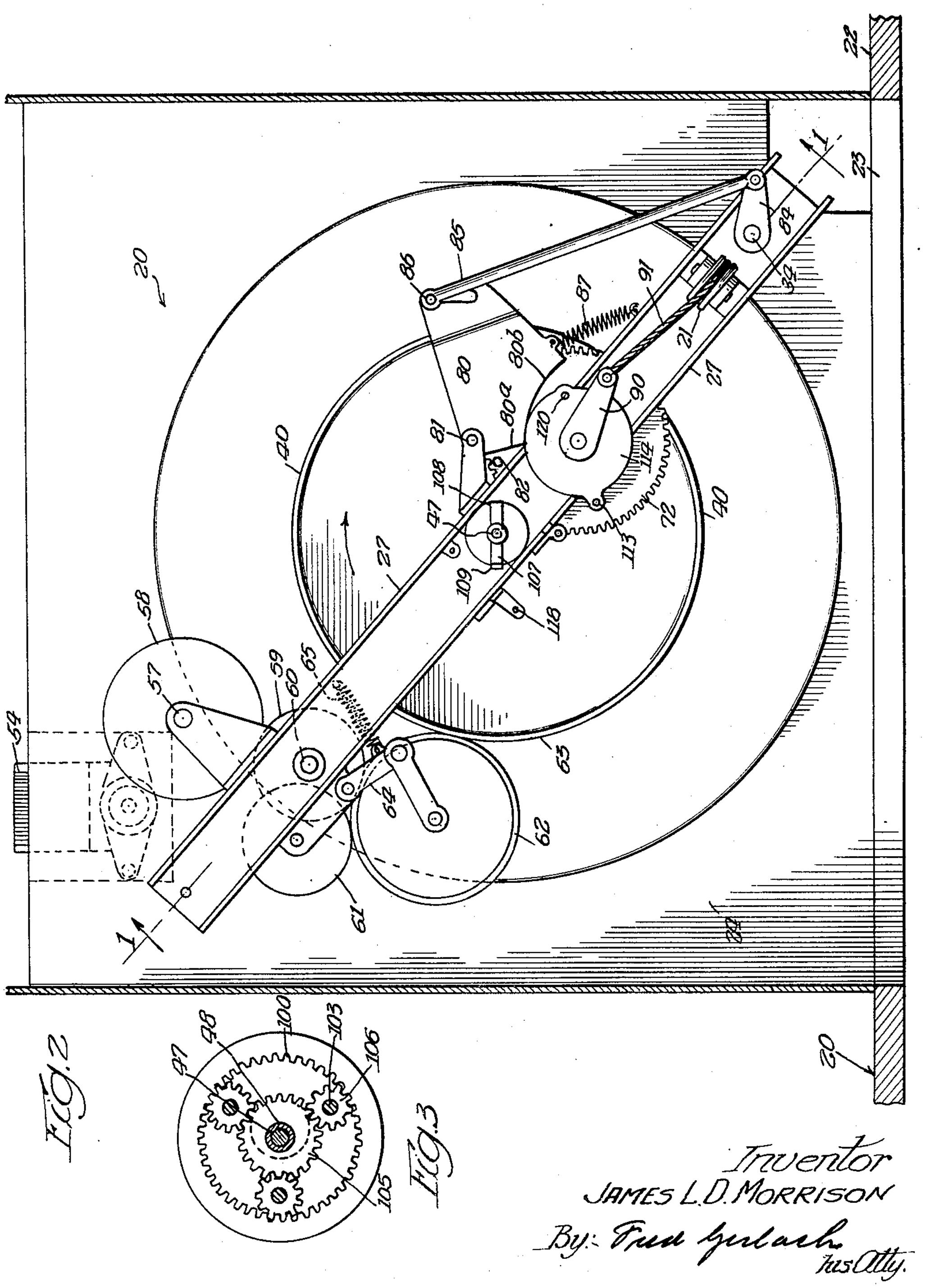
Fig. 2 is a plan view, parts being omitted, the walls of the compartment being shown in section.
Fig. 3 is a horizontal section taken on line 3—3 of Fig. 5.
Figure 4:
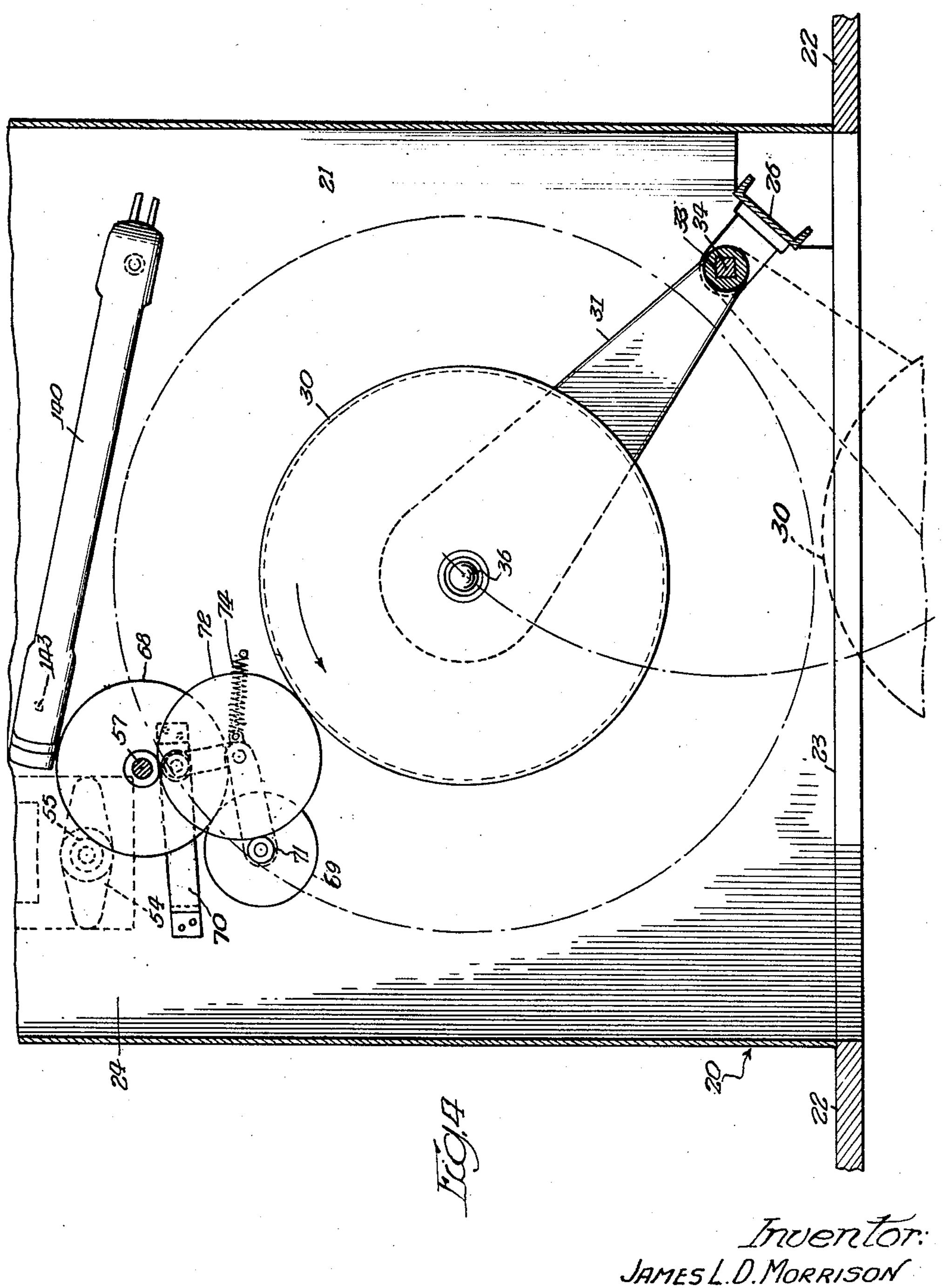
Fig. 4 is a horizontal section taken on line 4—4 of Fig. 1.
Figures 9, 10:
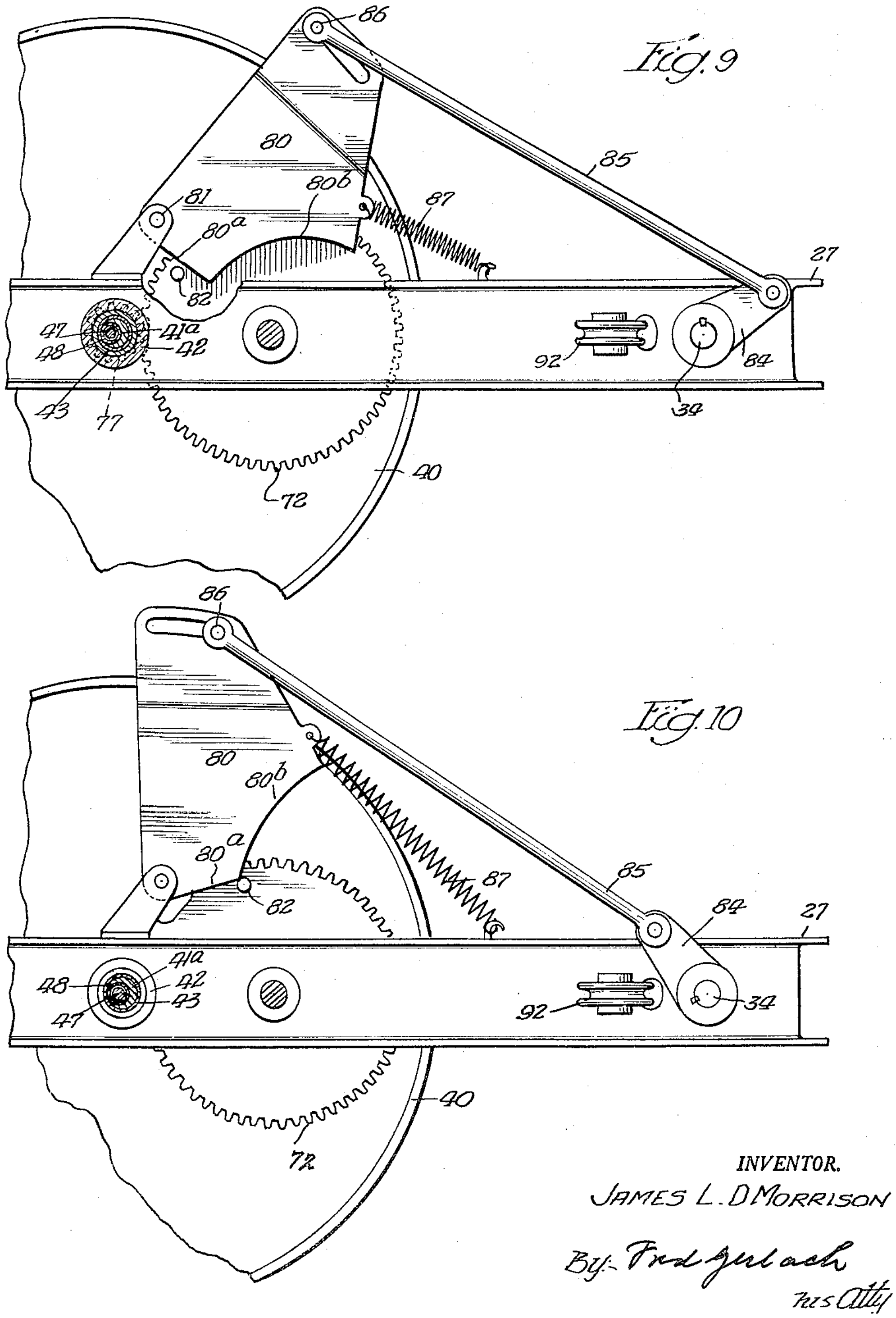
Fig. 9 is a plan of the mechanism for swinging the lower turntable into and out of the compartment, in its operative or normal position in the cabinet.
Fig. 10 is a similar view illustrating the mechanism for swinging the lower turntable when said turntable has been shifted to the outside of the cabinet.
Figure 11:
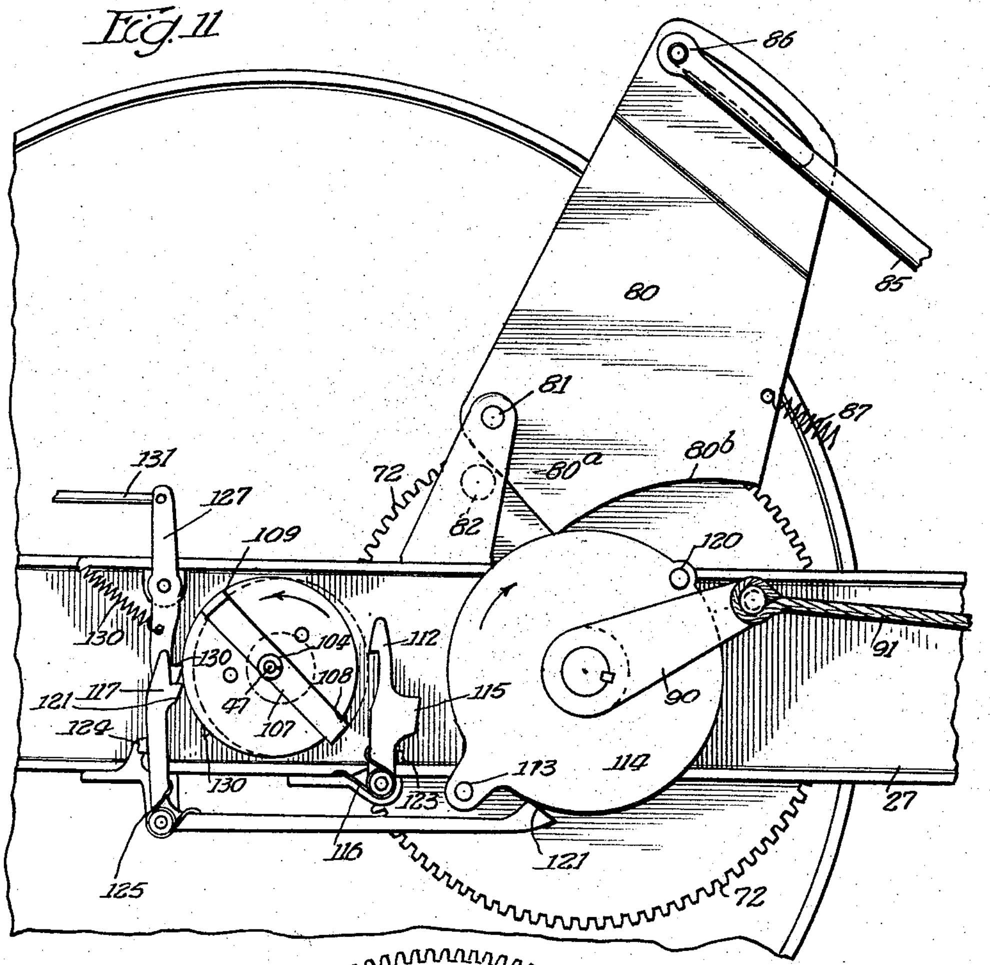
Fig. 11 is a partial plan view of the lifting device for the lower turntable, the control device for the detent for supporting record-disks on the upper spindle, and the device for controlling the ejector.
Figure 12:
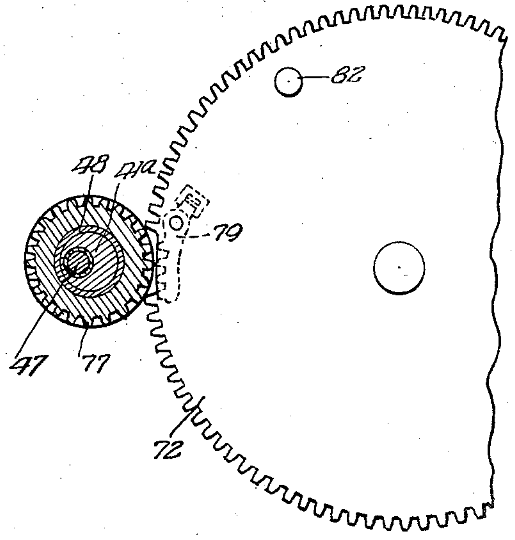
Fig. 12 is a section taken on line 12—12 of Fig. 5.

The operation will be as follows: assuming the phonograph to be idle and the lower turntable 30 to be positioned in the cabinet and under the turntable 40, with or without a group of record-disks which have been reproduced thereon, and it is desired to successively reproduce records on both faces of another group of disks, the operator will start the motor 54 by the usual starting button (not shown). Motor 54 will drive shaft 57, which will, through pulleys 58, 59, 60, 61 and 62, drive the upper turntable 40 and spindle 43 in counter-clockwise direction and the pinion 77 will rotate with said turntable. Ejector 49 on shaft 48, detent 46 and its shaft 47, carrier 101 and 102, pinion 105, planet-pinions 106, internal gear 100 and lever 107, will rotate together bodily. The gear 100 and lever 107 are rotated eccentrically to the axis of spindle 43 so that the ends of lever 107 and opposite peripheral portions of gear 100 will alternately rotate toward and away from the levers 112, 117 and 127. Gear 72 and the device for swinging arm 31 and turntable 30 will be in their normal position as shown in Fig. 9. The normal position of the lifting mechanism for the lower turntable 30 is shown in Figs. 1, 2 and 11. The normal positions of control levers 112, 117 and 127 are shown in Fig. 11. To start the cycle of operations for the change of a group of record-disks, the detent 79 will be controlled by the operator to couple gear 72 and pinion 77 for a complete revolution of gear 72. During the initial portion of this cycle of gear 72, stud 82 will engage cam-member **80*a* and swing cam-plate 80 against the force of spring 87 from the position shown in Fig. 9 to the position shown in Fig. 10. Cam-plate 80 will shift link 85 to swing arm 84, shaft 34 and arm 31 to move the lower turntable 30 and spindle 36 from the position in the cabinet, shown in full lines, to the outside of the cabinet as shown by dotted lines in Fig. 3. The reproduced record-disks on the lower turntable, if any, can then be conveniently lifted off spindle 36 and removed, and another group of record-disks can be readily loaded around spindle 36 and on turntable 30. As gear 72 continues its rotation, spring 87, under control of stud 82 and cam-member 80*b*, will retract plate 80 and link 85, arm 84, shaft 34 and arm 31, and move the turntable 30 with the disks thereon and arm 31 back to their operative position in the cabinet. Before the conclusion of these swinging movements of turntable 30, detent 46 will be rotated to concentricity with ejector 49 and spindle 43, for guiding record-disks from the lower spindle 36 onto the upper spindle 43. When stud 113, which rotates with gear 72, engages cam 115, the lever 112 will be shifted into the path of abutment 108 on lever 107 which is eccentric to the axis of spindle 43. Lever 107, shaft 47 and detent 46 will be arrested against rotation during a cycle of one-half revolution of spindle 43, shaft 48 and carrier 101 and 102, and ejector 49. Spindle 43 and ejector 49 will be rotated a cycle of one-half revolution relatively to detent 46 to bring said detent into concentricity with spindles 43 and 36 and the ejector 49, for guiding record-disks from the lower turntable 30 onto spindle 43, as shown in Fig. 7. The arm 90 rotating with gear 72 will operate cable 91, hub 33 and arm 31 to lift turntable 30 which will slide the record-disks thereon off the lower spindle 36 onto the upper spindle 43 and above the ejector 49. Spindle 36 will abut the lower end of spindle 43 and spring 50 will yield to permit spindle 36 to withdraw from the record-disks for their transfer onto the spindle 49, as shown in Fig. 7. After the disks are raised onto the upper spindle 43, detent 46 is shifted back to its normal position for holding the group of disks on said spindle. Stud 120 on disk 114 which rotates with gear 72, will strike cam 121 on lever 117 and move lever 117 into the eccentric path of abutment 109 on lever 107, which will arrest shaft 47 and detent 46 against rotation with spindle 43, for a cycle of one-half revolution of spindle 43 and carrier 101 and 102. At the end of said cycle, abutment 109 is moved away from lever 117. This will rotate the spindle 43 and ejector 49 relatively to the detent 46 until said detent is in its normal position eccentric to said spindle 43 and ejector 49 for suspending record-disks on said spindle. Next, arm 90 in its rotation with gear 72 will operate cable 91 to lower hub 33 and arm 31 until turntable 30 will be in its operative position for receiving record-disks dropped from spindle 43. During the lowering of turntable 30, spring 50 will retract spindle 36 to its upstanding operative position for holding record-disks concentrically on turntable 30. The needle 142 on the tone-arm 140 is then engaged with the under face of the lowermost disk on spindle 43 for reproducing the record thereon while the spindle 43 and turntable 40 are driven in counter-clockwise direction by the friction gearing described including pulley 62 which engages the upper turntable 40. The tone-arm 140 is then swung to one side of turntable 30 for clearing the path of a disk from spindle 43 onto the lower turntable 30. The connection 131 is then actuated to operate ejector 49 to drop the lowermost disk onto the lower turntable. Connection 131 will shift lever 127 into the eccentric path of tooth 130 to arrest gear 100 during a cycle of one-half revolution of spindle 43 and carrier 101 and 102. This arrest will cause gear 100 to operate the planet pinions 105 to rotate shaft 47 and ejector 49 a complete revolution relatively to the spindle 43 and detent 46. The ejector in the hole in the lowermost disk will move into concentricity with detent 46 so that said disk will drop off spindle 43 and then move back to its normal position concentric with spindle 43 where it will permit the next disk to drop onto detent 46. When a disk is dropped onto turntable 30 and around spindle 36, the record on its upper face will be exposed for reproduction by the needle 143 on the tone-arm 140, and rotation of the disk in clockwise direction. The tone-arm 140 will then be moved to engage needle 143 with the record on the upper face of the disk for its reproduction while the lower turntable 30** is driven in clockwise direction.

This cycle of operations which includes reproducing the record on the lowermost disk on spindle 43, dropping said disk onto the lower turntable 30 and reproducing the record on the upper face of the dropped disk, is repeated until the records on both faces of the entire stack of disks placed on the upper spindle 43 have been successively reproduced. The detent 79 will then be actuated to start gear 72 for rotation of a cycle of one revolution, during which turntable 30 will be shifted to the outside of the cabinet. The record-disks on said turntable will be replaced by another group, said turntable will be retracted into the cabinet, and the disks thereon will be transferred onto the upper spindle, as before described.

The invention exemplifies a phonograph of the cabinet type for successively reproducing records on both faces of the disks, which includes power-driven devices or mechanisms for swinging the lower turntable to the outside of the cabinet to load disks thereon for lifting the disks onto the upper spindle, for operating the detent for holding the disks on the upper spindle to guide the disks while they are being transferred, and for operating the ejector for dropping the disks from the upper spindle.

The invention is not to be understood as restricted to the details set forth since these may be modified within the scope of the appended claims without departing from the spirit and scope of the invention.

Having thus described my invention what I claim as new and desire to secure by Letters Patent is:

1. A phonograph comprising first and second rotatable spindles for supporting a vertical stack of records, the first of said spindles being fixedly supported, an arm mounting the second spindle and pivotally supported for movement between a position under the first spindle and an offset position for clearance in loading the stack of records on to the second spindle, transfer means operatively associated with said second spindle for bodily transferring the stack of records from the second spindle to the first spindle when the second spindle is under the first spindle to expose one side of the lowermost record of the stack for reproduction, means for dropping one record at a time from the first spindle into stacked relation on the second spindle for exposing the opposite side of the record, means for reproducing the exposed side of the record in each stack, and change cycle control means operatively associated with said spindles, said transfer means, said record dropping means, and said reproducing means for moving said second spindle to its position under said first spindle, playing one record after another, and moving said second spindle to its offset position.

2. A phonograph comprising rotatable means for supporting a vertical stack of records, said means being fixedly supported, a rotatable turntable, an arm mounting the turntable and pivotally supported for movement between a position under the stack supporting means and an offset position for clearance in loading the stack of records on to the turntable, transfer means operatively associated with said turntable for bodily transferring the stack of records from the turntable to the stack supporting means when the turntable is under the stack supporting means to expose one side of the lowermost record of the stack for reproduction, means for dropping one record at a time from the stack supporting means into stacked relation on the turntable for exposing the opposite side of the record, means for reproducing the exposed side of the record in each stack, and change cycle control means operatively associated with said stack supporting means and said turntable, said transfer means, said record dropping means, and said reproducing means for moving said turntable to its position under said stack supporting means, playing one record after another, and moving said turntable to its offset position.

3. A phonograph comprising first and second spindles for supporting a vertical stack of records, the first of said spindles being rotatable and fixedly supported, an arm mounting the second spindle and pivotally supported for movement between a position under the first spindle and an offset position for clearance in loading the stack of records on to the second spindle, transfer means operatively associated with said second spindle for bodily transferring the stack of records from the second spindle to the first spindle when the second spindle is under the first spindle to expose one side of the lowermost record of the stack for reproduction, means for dropping one record at a time from the first spindle into stacked relation on the second spindle, means for reproducing the exposed side of said lowermost record, and change cycle control means operatively associated with said spindles, said transfer means, said record dropping means, and said reproducing means for moving said second spindle to its position under said first spindle, playing one record after another, and moving said second spindle to its offset position.

4. A phonograph comprising first and second means for supporting a vertical stack of records, the first of said stack supporting means being fixedly supported, means mounting the second stack supporting means for movement between a position under the first stack supporting means and an offset position for clearance in loading the stack of records on to the second stack supporting means, transfer means operatively associated with said second stack supporting means for bodily transferring the stack of records from the second stack supporting means to the first stack supporting means when the second stack supporting means is under the first stack supporting means to expose one side of the lowermost record of the stack for reproduction, means for dropping one record at a time from the first stack supporting means into stacked relation on the second stack supporting means for exposing one record after another for reproduction, means for reproducing the exposed side of each lowermost record, and change cycle control means operatively associated with said first and second stack supporting means, said transfer means, said record dropping means, and said reproducing means for moving said second stack supporting means to its position under said first stack supporting means, playing one record after another, and moving said second stack supporting means to its offset position.

References Cited in the file of this patent

UNITED STATES PATENTS

| | | |
|---|---|---|
| 1,925,402 | Polakoff | Sept. 5, 1933 |
| 2,592,323 | Nicole et al. | Apr. 8, 1952 |
| 2,598,594 | Miller et al. | May 27, 1952 |
| 2,634,135 | Carson | Apr. 7, 1953 |
| 2,648,541 | Burt | Aug. 11, 1953 |
| 2,657,061 | Sperber | Oct. 27, 1953 |
| 2,712,940 | MacDuff | July 12, 1955 |
| 2,777,699 | Woodruff | Jan. 15, 1957 |

FOREIGN PATENTS

| | | |
|---|---|---|
| 520,941 | Great Britain | May 8, 1940 |
| 668,301 | Great Britain | Mar. 12, 1952 |